(12) United States Patent
Huang et al.

(10) Patent No.: US 7,009,670 B1
(45) Date of Patent: Mar. 7, 2006

(54) ACHROMATIC QUARTER-WAVE FILMS

(75) Inventors: Yuhua Huang, Orlando, FL (US); Thomas X. Wu, Orlando, FL (US); Shin-Tson Wu, Orlando, FL (US)

(73) Assignee: Research Foundation of the University of Central Florida, Inc., Orlando, FL (US)

( * ) Notice: Subject to any disclaimer, the term of this patent is extended or adjusted under 35 U.S.C. 154(b) by 42 days.

(21) Appl. No.: 10/811,261

(22) Filed: Mar. 26, 2004

Related U.S. Application Data

(60) Provisional application No. 60/459,409, filed on Apr. 1, 2003.

(51) Int. Cl.
*G02F 1/1335* (2006.01)

(52) U.S. Cl. ............................ 349/117; 349/96; 349/98; 349/118; 349/119; 349/120

(58) Field of Classification Search ................ 349/96, 349/98, 117–120
See application file for complete search history.

(56) References Cited

U.S. PATENT DOCUMENTS

| 5,863,457 A | * | 1/1999 | Hasebe et al. | ......... 252/299.01 |
| 6,204,904 B1 | * | 3/2001 | Tillin et al. | ................. 349/119 |

OTHER PUBLICATIONS

S. Pancharatnam, *Proceedings of the Indian Academy of Science*, Sec. A., vol. 41, 130-136 (1955).
Tae-Hoon Yoon, Gi-Dong Lee and Jae Chang Kim, *Nontwist quarter-wave liquid-crystal cell for a high-constrast reflective display*, vol. 25, No. 20/Optics Letters, Oct. 15, 2000.

* cited by examiner

*Primary Examiner*—Dung T. Nguyen
*Assistant Examiner*—Phu Vu
(74) *Attorney, Agent, or Firm*—Brian S. Steinberger; Law Offices of Brian S. Steinberger, P.A.

(57) ABSTRACT

The achromatic quarter-wave film of this invention has a laminated twisted nematic liquid crystal film sandwiched between two uniaxial polymer films to provide a optical component which converts linearly polarized light into circularly polarized radiation which upon reflection back through said optical component is blocked from outward radiation by the polarizer for the initial incident wide spectrum light thus realizing wider broadband width for full color flat panel displays.

12 Claims, 11 Drawing Sheets

ACHROMATIC QUARTER-WAVE FILMS

This invention claims the benefit of priority to U.S. Provisional patent application 60/459,409 filed Apr. 1, 2003.

FIELD OF THE INVENTION

This invention relates to a broadband quarter-wave film, and in particular to the combination of a twisted nematic liquid crystal (TN-LC) film sandwiched between two uniaxial polymeric films to provide an achromatic quarter-wave film.

BACKGROUND AND PRIOR ART

Reflective and transflective liquid crystal displays (LCDs) have been extensively used in personal information display because of their many advantages including low power consumption and light weight. In most reflective and transflective direct-view devices, however, an achromatic quarter-wave retardation film is required to provide a good dark state and high contrast ratio.

The combination of a chromatic half-wave film and a chromatic quarter-wave film at a specific angle has been commonly used for broadband quarter-wave film applications. See for example, S. Pancharatnam, *Proceedings of the Indian Academy of Science*, Section A, Vol. 41, 130 (1955); and T. H Yoon, G. D. Lee and J. C. Kim, *Opt. Lett.*, Vol. 25, 1547 (2000). This combination fabrication method is rather simple, but the spectral bandwidth is insufficient for a full color display. Recently, Zhu et al filed a U.S. provisional patent application (60/419,181) on this approach in which a broadband quarter-wave film is realized with the combination of a half-wave film and a TN-LC film in a specific configuration. The result is a spectral bandwidth has been largely improved, but is still inadequate, especially in the blue and red regions.

It remains necessary to provide a quarter-wave film with much wider bandwidth for useful full color flat panel displays.

SUMMARY OF THE INVENTION

A first objective of this invention is to design a quarter-wave film with markedly increased bandwidth.

A second objective of the invention is to provide a device functioning as a broadband quarter-wave film with the combination of a twisted nematic liquid crystal (TN-LC) and two uniaxial polymeric films.

A third objective of the invention is to provide a new method for optimizing the design of a broadband quarter-wave film.

A fourth objective of the invention is to provide a broadband quarter-wave film with the use of TN-LC and two uniaxial polymeric films for reflective and transflective liquid crystal display over the whole visible range.

A fifth objective is to provide a quarter-wave film with much wider spectral bandwidth by optimizing the device configuration with an optimal algorithm method.

Further objects and advantages of this invention will be apparent from the following detailed description of a presently preferred embodiment, which is illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1A:
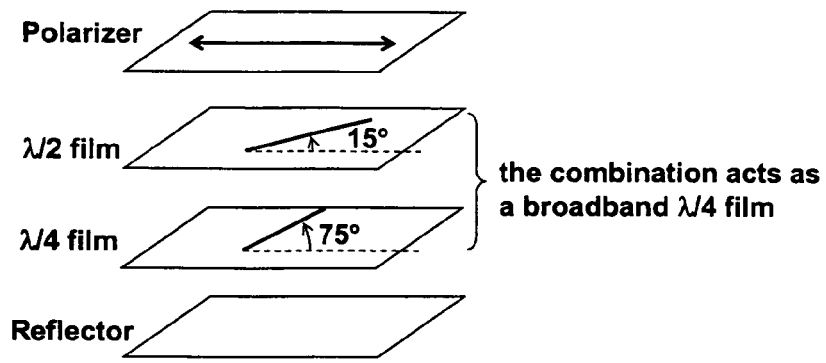
FIG. 1A shows the sketch of the conventional broadband quarter-wave film.
Figure 1B:
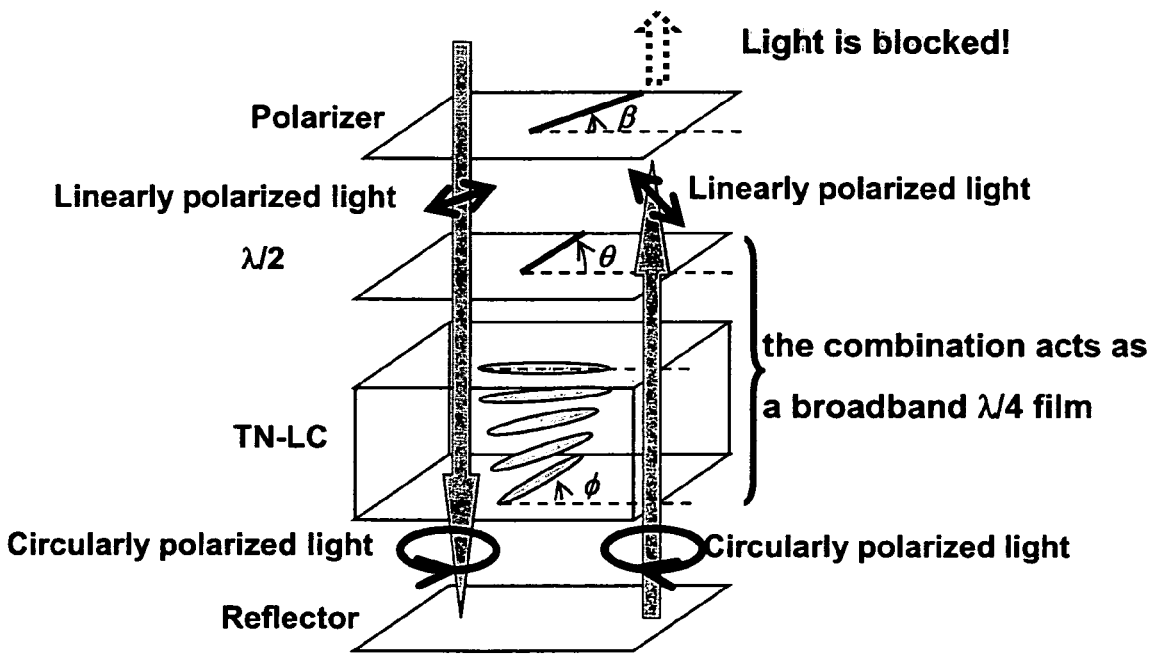
FIG. 1B shows the sketch of another conventional broadband quarter-wave film.

This invention provides a new device functioning as a broadband quarter-wave film. The prior art known devices are shown in FIGS. 1A and 1B. A novel device embodying the achromatic quarter-wave films of the present invention is shown in FIG. 2.

The novelty is to use an optimal algorithm method to design a device featuring a laminated optical component, which has the property of exhibiting a much wider bandwidth than the devices of the prior art. To achieve a broadband quarter-wave plate, a twisted nematic liquid crystal (TN-LC) polymeric film is sandwiched between two uniaxial polymeric films in a specific configuration to modify the incident light polarization according to the invention as set forth hereafter. The polarizer is used to choose a linearly polarized light at a specific direction from the unpolarized incident light. When these optical components are properly organized, the linearly polarized light in a wide spectral range becomes circularly polarized after passing through the two uniaxial compensate films and the TN-LC layer. Upon reflection by the reflector, the circularly polarized light passes through the TN-LC film and the two uniaxial films one more time and finally become linearly polarized. At this time, however, the axis of the outgoing linearly polarized light is orthogonal to the polarizer. Therefore, the light is blocked, i.e. retarded by the polarizer leading to a dark state. In this situation, the lamination of the two films and the TN-LC film functions as a quarter-wave film.

Figure 2:
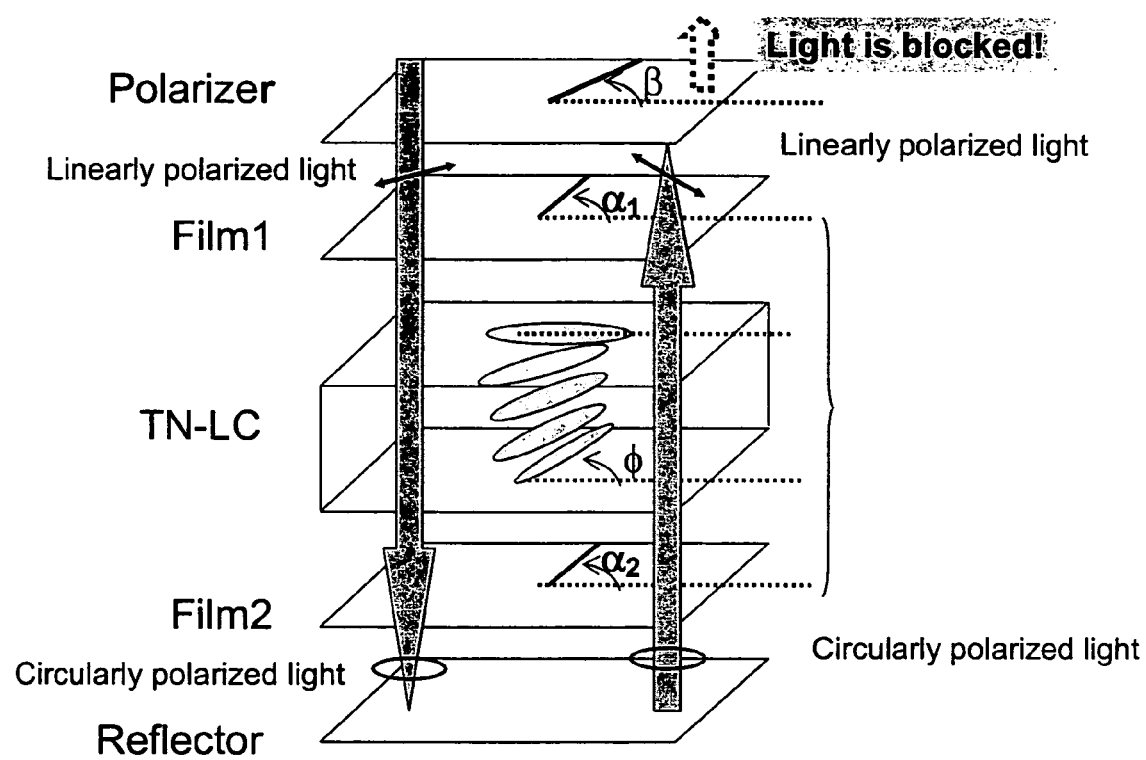
FIG. 2 shows the configuration of the novel achromatic quarter-wave retardation film.

According to the configuration shown in FIG. 2, one can obtain the normalized reflectance R using the following Jones matrix method:

$$R = \left| (\cos\beta \ \sin\beta) M_{film1} M_{LC}^{-1} M_{film2} M_{film2} M_{LC} M_{film1} \cdot \begin{pmatrix} \cos\beta \\ \sin\beta \end{pmatrix} \right|^2 \quad (1)$$

where $$M_{LC} = \begin{bmatrix} \cos\phi & -\sin\phi \\ \sin\phi & \cos\phi \end{bmatrix}$$

$$\begin{bmatrix} \cos X - i(\Gamma/2)(\sin X/X) & \phi(\sin X/X) \\ -\phi(\sin X/X) & \cos X + i(\Gamma/2)(\sin X/X) \end{bmatrix}$$

$$M_{film1} = \begin{bmatrix} \cos\alpha_1 & -\sin\alpha_1 \\ \sin\alpha_1 & \cos\alpha_1 \end{bmatrix}$$

$$\begin{bmatrix} \exp(-i\pi d_1 \Delta n_{film}/\lambda) & 0 \\ 0 & \exp(i\pi d_1 \Delta n_{film}/\lambda) \end{bmatrix}$$

$$\begin{bmatrix} \cos\alpha_1 & \sin\alpha_1 \\ -\sin\alpha_1 & \cos\alpha_1 \end{bmatrix}$$

$$M_{film1} = \begin{bmatrix} \cos\alpha_2 & -\sin\alpha_2 \\ \sin\alpha_2 & \cos\alpha_2 \end{bmatrix}$$

$$\begin{bmatrix} \exp(-i\pi d_2 \Delta n_{film}/\lambda) & 0 \\ 0 & \exp(i\pi d_2 \Delta n_{film}/\lambda) \end{bmatrix}$$

$$\begin{bmatrix} \cos\alpha_2 & \sin\alpha_2 \\ -\sin\alpha_2 & \cos\alpha_2 \end{bmatrix}$$

Here, $\Gamma=2\pi d\Delta n/\lambda_0$, $X=\sqrt{\phi^2+(\Gamma/2)^2}$, $\phi$ is the twisted angle of the TN-LC film, $\beta$ is the angle between the rear rubbing direction of the TN-LC film and the polarization direction of the incident linearly polarized light, $\alpha_1$ and $\alpha_2$ are the angles between the rear rubbing direction of the TN-LC film and the optical axes of the two uniaxial polymeric films, respectively, and d, $d_1$ and $d_2$ are the LC cell gap and the thickness of the two films, respectively.

In this invention, the liquid crystal (LC) and polymer material dispersions as described in Eq. (2) have been taken into consideration:

$$\Delta n = G \frac{\lambda^2 \cdot \lambda^{*2}}{\lambda^2 - \lambda^{*2}} \quad (2)$$

In Eq. (2), G is a proportionality constant and $\lambda^*$ is a mean resonant wavelength. It should be noted that it is very important to choose LC and polymeric films with similar molecular structures to ensure a better phase matching between them [Wu and Yang, "Reflective Liquid Crystal Displays", (Wiley, Chichester, 2001)] since the mean resonant wavelengths $\lambda^*$ are usually different for materials with different molecular structure, which induces phase mismatching in a spectral range between them. A similar molecular structure leads to a similar $\lambda^*$ so that the wavelength dispersion effect is compensated. In this invention, one uses an LC and polymer containing a phenyl ring as an example of similar molecular structures. Their $\lambda^*$ is in the vicinity of 210 nm. Here, one can assume that the films employed have $\Delta n\sim 0.1$ at $\lambda=550$ nm for liquid crystal and 0.033 for the polymer films. Therefore, $G\sim 1.937\times 10^{-6}$ nm$^{-2}$ and $0.639\times 10^{-6}$ nm$^{-2}$ for the LC and polymer films, respectively.

To make the combined films and TN-LC layer in FIG. 2 function as a broadband quarter-wave film, the two films, the TN-LC layer and the polarizer should be in a proper configuration. In this invention, one uses the optimal algorithm method to design and optimize the configuration of the device. To get an optimal configuration, one takes a cost function to be:

$$\text{Cost} = \int_{400nm}^{700nm} T(\lambda) d\lambda \quad (3)$$

Then, one minimizes the cost function by searching the values of $\phi$, $\beta$, $\alpha_1$, $\alpha_2$, d, $d_1$ and $d_2$.

Figure 3:
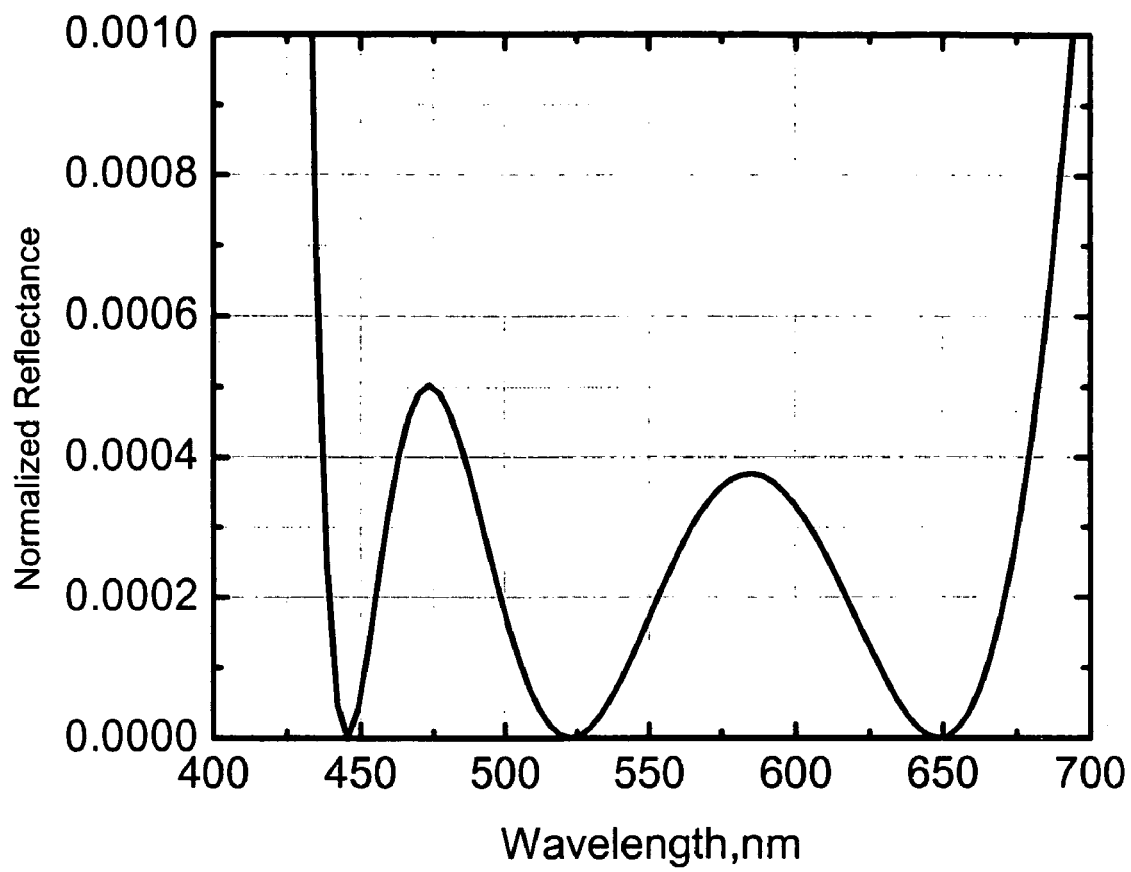
FIG. 3 shows the optimal simulation results with the optimal algorithm method.
Figure 4:
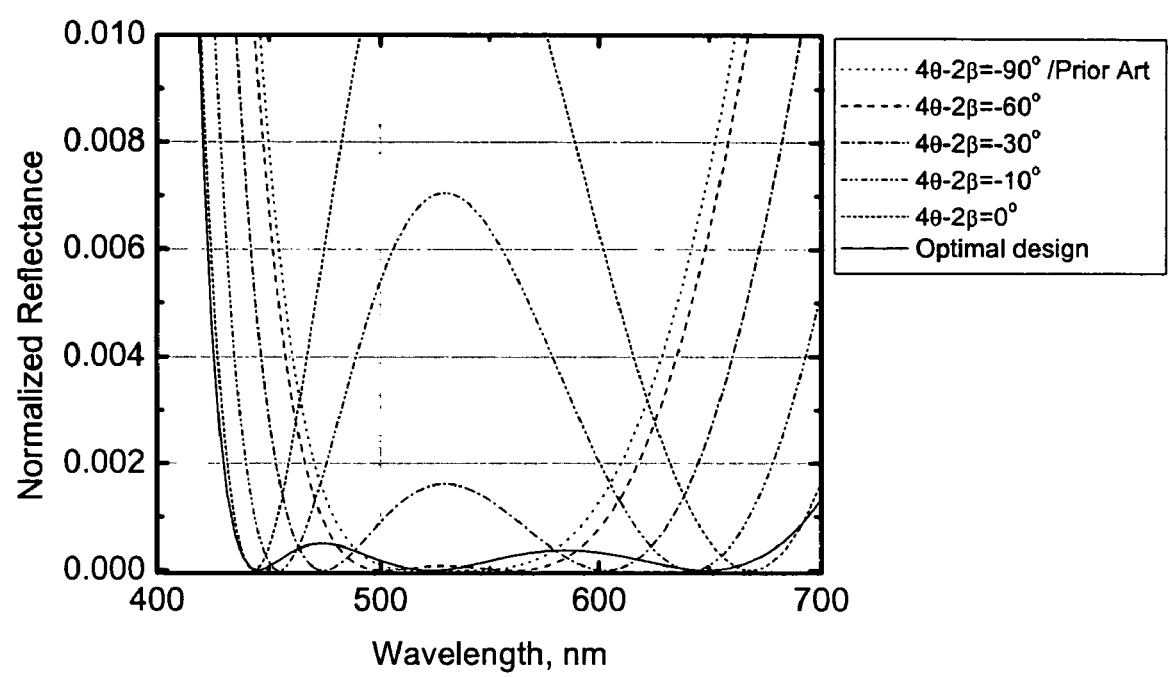
FIG. 4 shows the comparisons of the normalized reflectance achromatic retardation film of the invention with that of the conventional broadband quarter-wave film of FIG. 1B.

Using this method, one can always find a group of parameters ($\phi$, $\beta$, $\alpha_1$, $\alpha_2$, d, $d_1$ and $d_2$) for the TN-LC film and the uniaxial films to get excellent results over the entire range of visible light, as shown in FIG. 3. In this configuration, the twist angle of the TN cell is found to be 77.5°. The incident wave is linearly polarized at $\beta=18.8°$ and the angles $\alpha_1$ and $\alpha_2$ for the compensation Film-1 and Film-2 are 91.2° and −50.1°, respectively. The thickness of the TN cell, Film-1 and Film-2 are 4.9, 3.3, and 2.48 μm, respectively. Compared with the prior art structures, the system of this invention has a much wider bandwidth, as shown in FIG. 4. In FIG. 4, the solid line is the simulation results of the present invention. The five lines with dashes, dots and other patterns correspond to the calculated results of the broadband quarter-wave film shown in FIG. 1B when $4\theta-\beta=-90°$, −60°, −30°, −10° and 0°, respectively. FIG. 4 graphically illustrates that our optimal design can provide wider bandwidth than the prior art devices for reflective and transflective liquid crystal display over the whole visible range between approximately 400 nanometers (nm) to approximately 700 nanometers (nm).

Figure 5A:
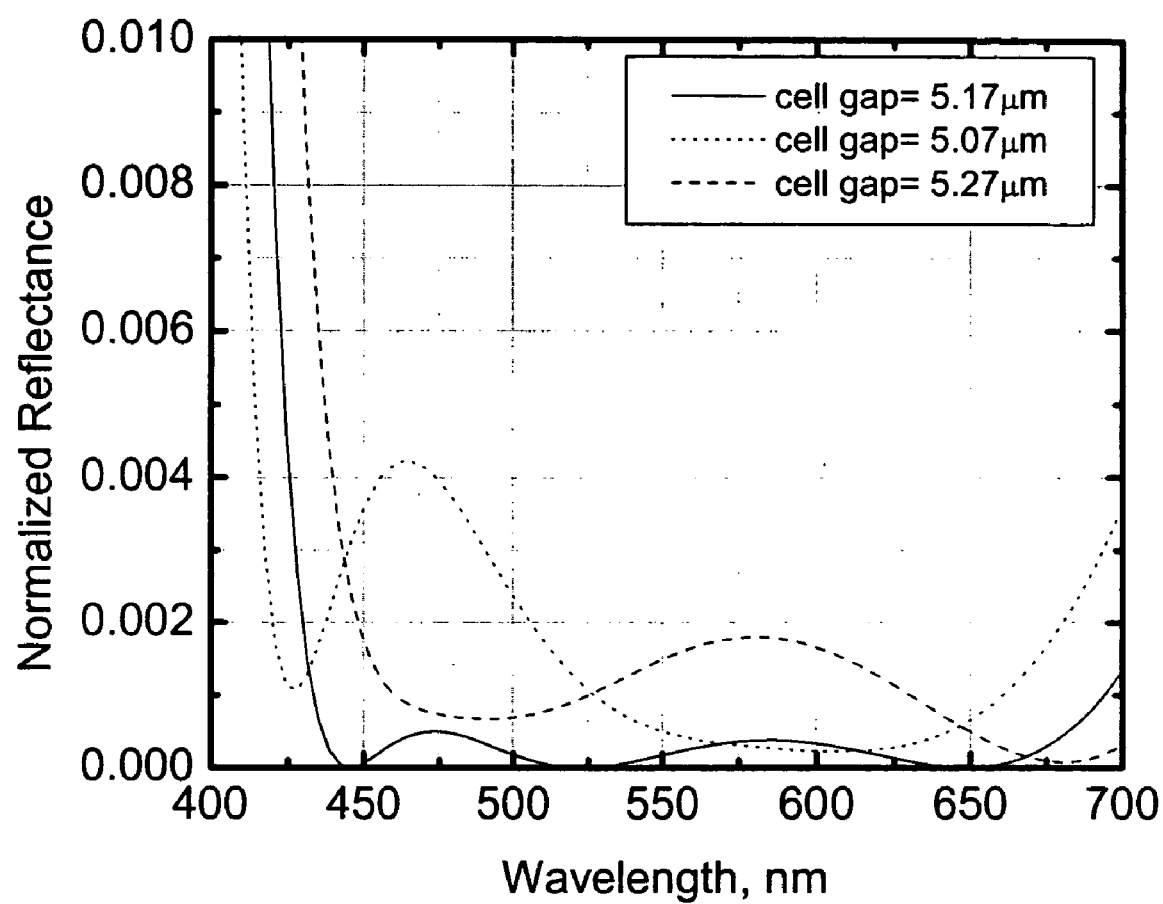
FIG. 5A shows the cell gap tolerance of the twisted nematic liquid crystal film.
Figure 5B:
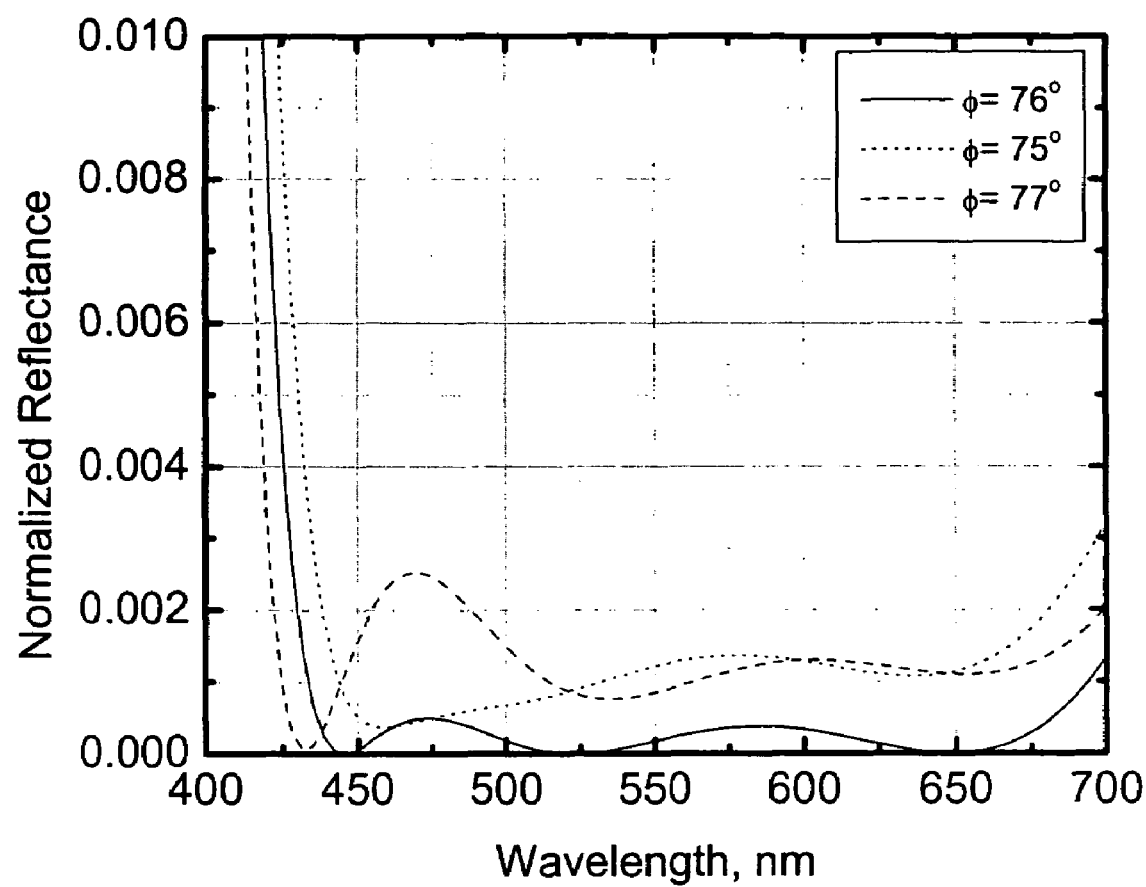
FIG. 5B shows the twist angle ($\phi$) tolerance of the twisted nematic liquid crystal film.
Figure 6A:
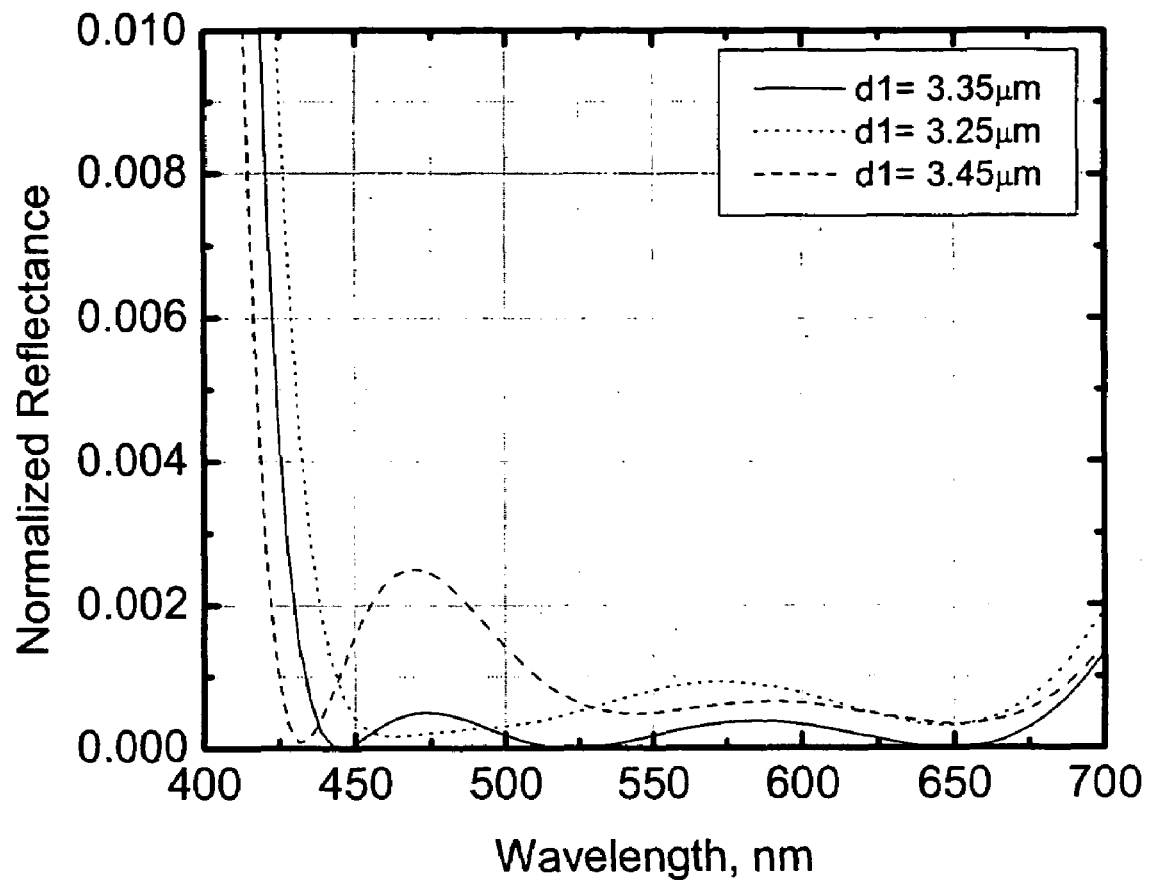
FIG. 6A shows the thickness ($d_1$) tolerance of film-1.
Figure 6B:
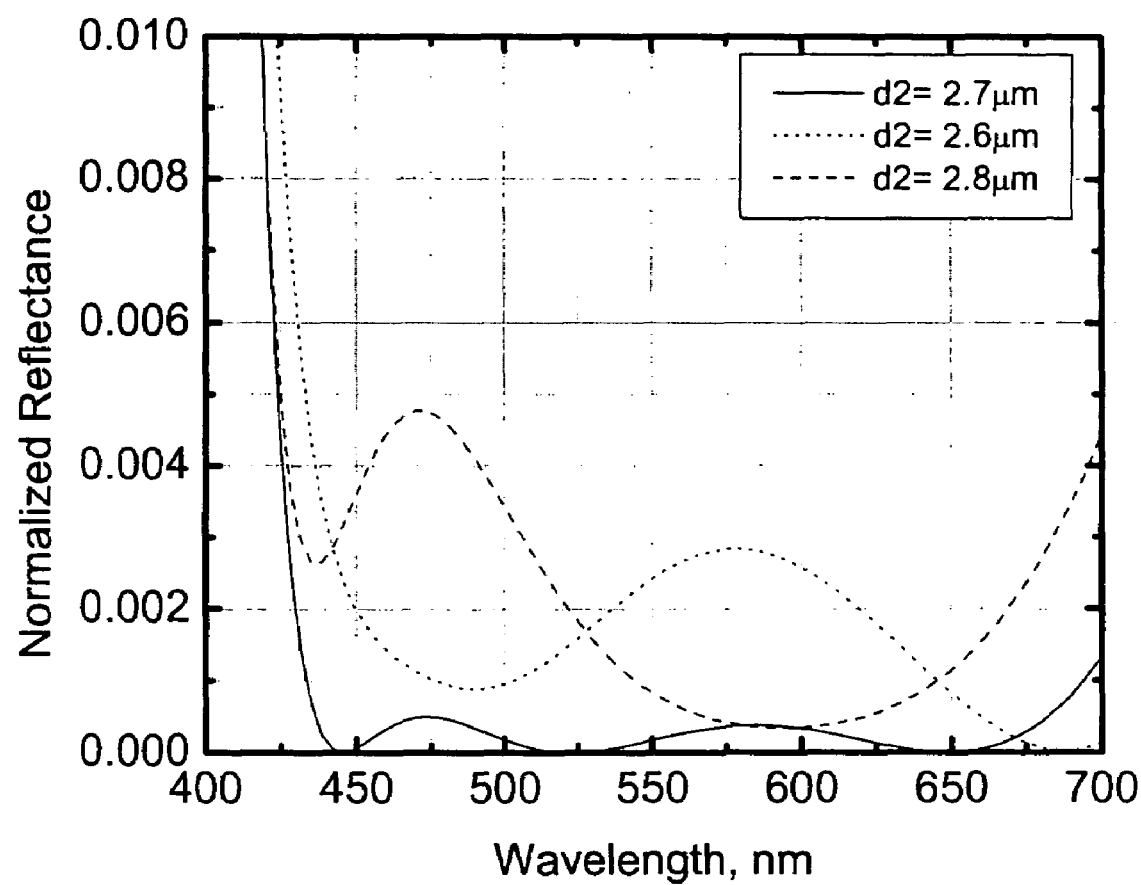
FIG. 6B shows the thickness ($d_2$) tolerance of film-2.
Figure 7A:
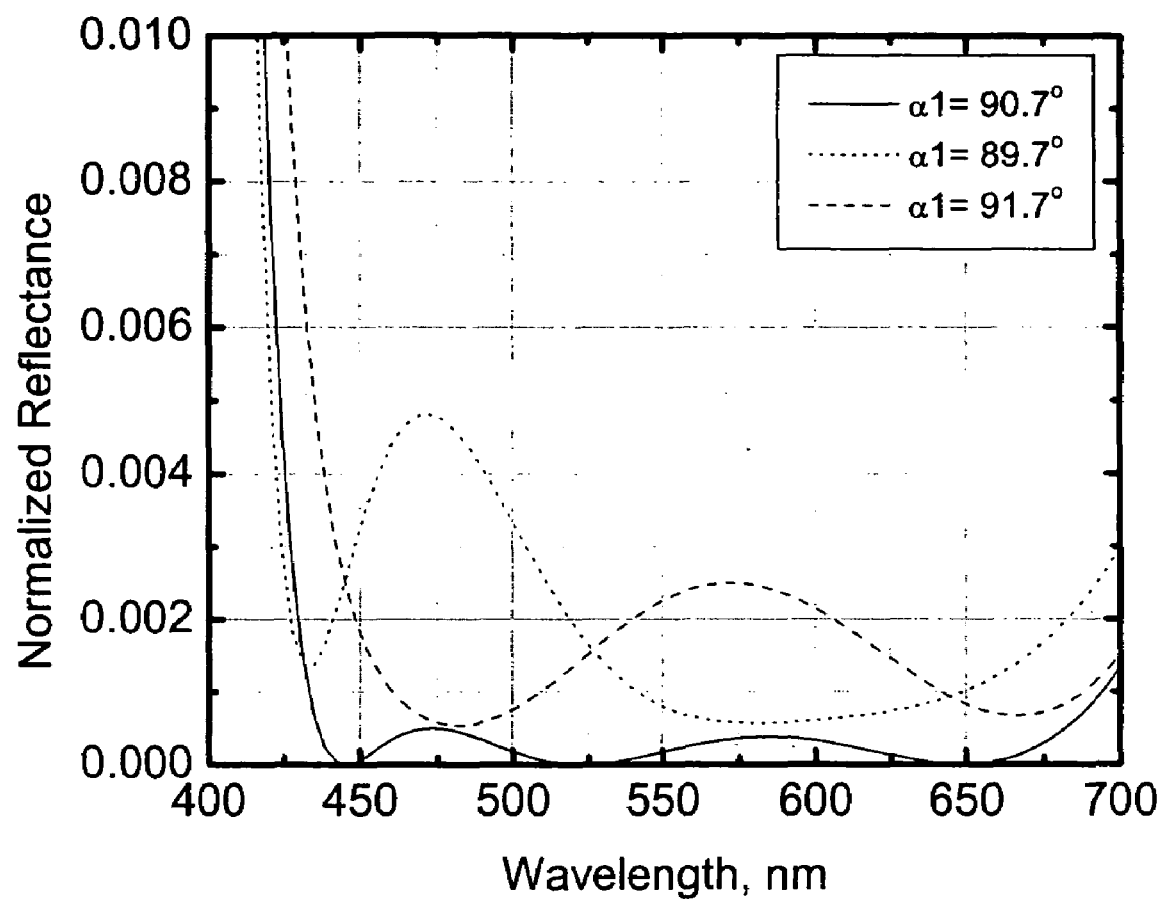
FIG. 7A shows the optical axis angle ($\alpha_1$) tolerance of film-1.
Figure 7B:
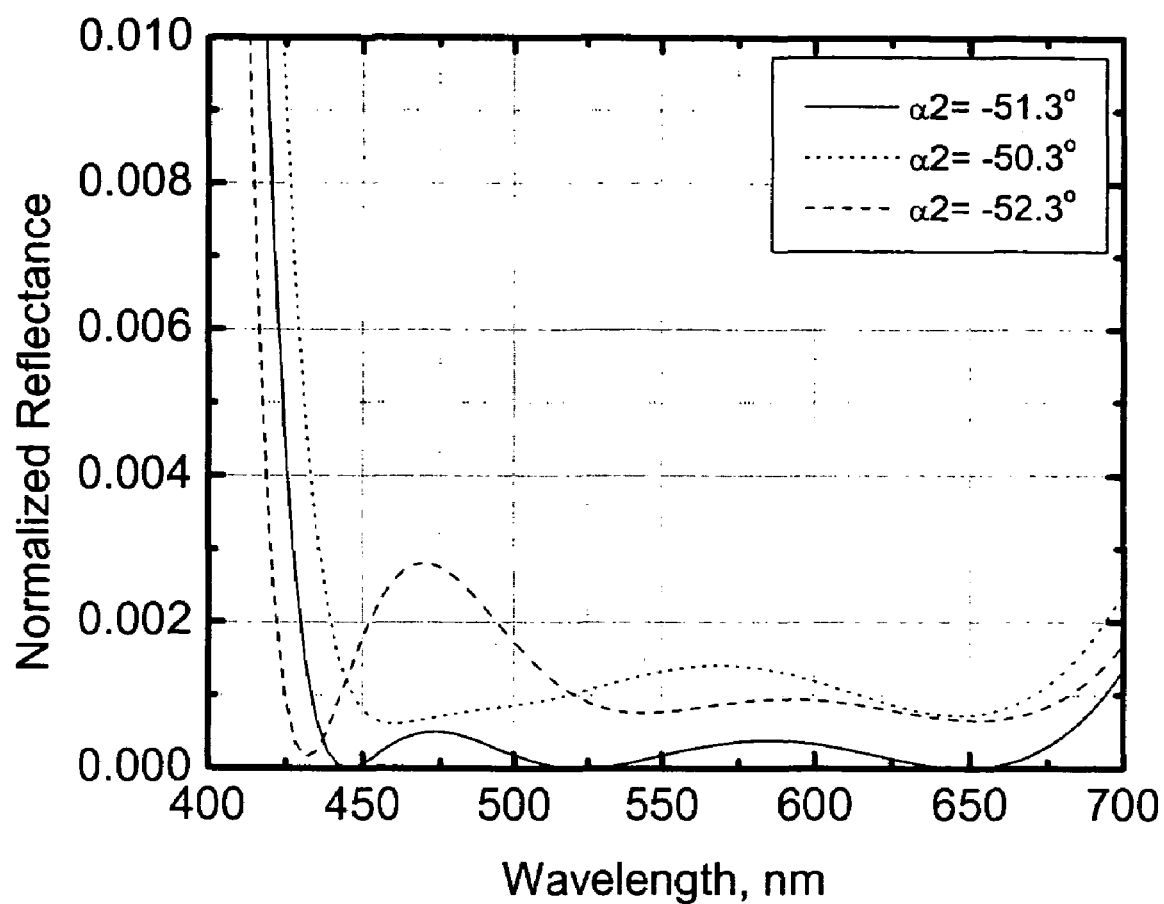
FIG. 7B shows the optical axis angle ($\alpha_2$) tolerance of film-2.
Figure 8:
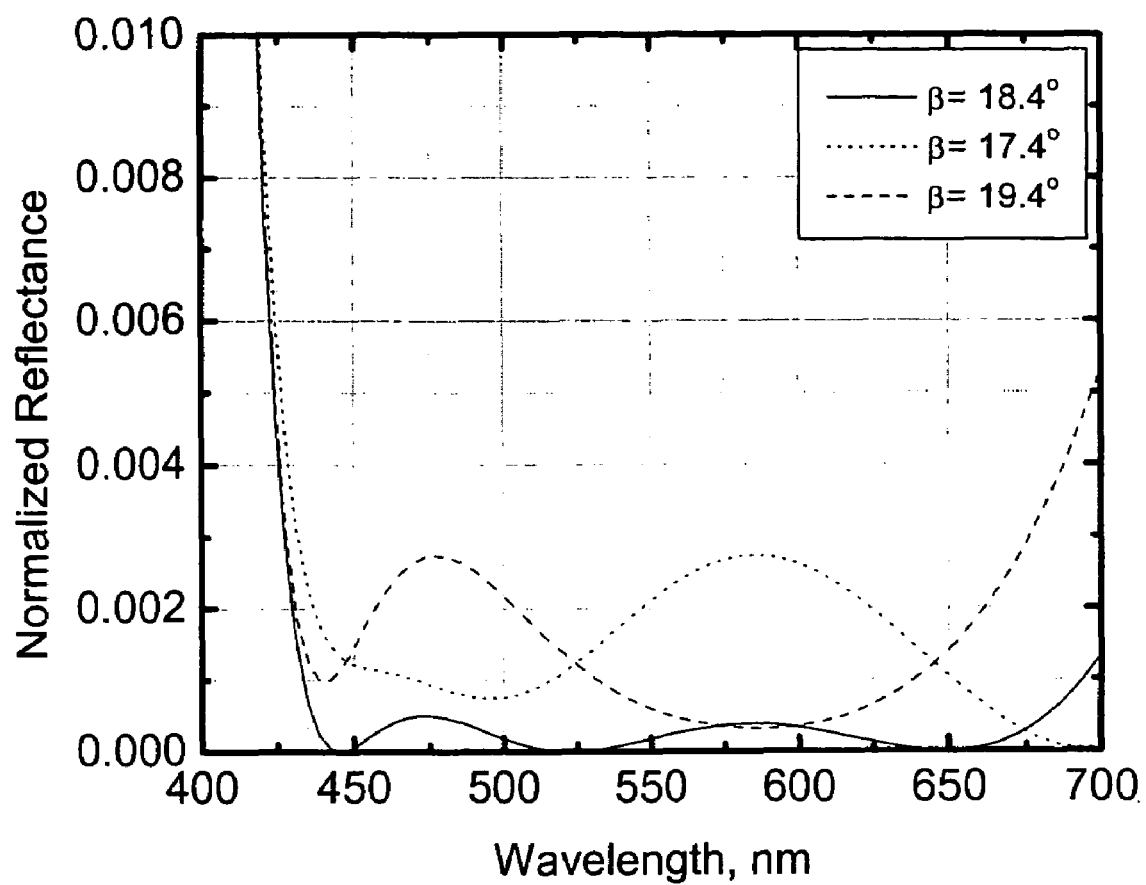
FIG. 8 shows the polarization direction tolerance of the incident polarized light.

The tolerance of the films thickness and configuration angles is an important factor for manufacturing yield. One must investigate the tolerance of all the parameters in detail, including the thickness and twist angle tolerance of the TN-LC film, the thickness and optical axis angle tolerance of the polymeric films, to obtain the desired configuration. FIG. 5A shows the cell gap tolerance of the twisted nematic liquid crystal film to be in a range from approximately 5.07 μm to approximately 5.27 μm and FIG. 5B shows the twist angle tolerance of the twisted nematic liquid crystal film is between approximately 75° and approximately 77°. FIG. 6A shows the thickness tolerance of film-1 is from approximately 3.25 μm to approximately 3.45 μm. FIG. 6B shows the thickness tolerance of film-2 is from approximately 2.6 μm to approximately 2.8 μm. FIG. 7A shows the optical axis angle tolerance of film-1 to be in a range from approximately 89.7° to approximately 91.7° and FIG. 7B shows the optical axis angle tolerance of film-2 to be in a range from approximately −50.3° to approximately −52.3°. FIG. 8 shows the polarization direction tolerance of the incident polarized light in a range from approximately 17.4° to approximately 19.4°. From the above figures, it is found that the laminated TN-LC film and two uniaxial polymeric films perform as a wonderful broadband quarter-wave film when the parameters have a small variation around their optimal values; that means the device has a relatively large manufacturing tolerance.

A method for manufacturing an achromatic quarter-wave film comprises a first step of laminating a twisted nematic-liquid crystal (TN-LC polymeric film between two uniaxial polymeric films as a sandwich to provide an optical component. Next, a polarizer means is provided to receive incident unpolarized light of a wide spectral bandwidth and convert said incident unpolarized light into linearly polarized light. The TN-LC polymeric film and two uniaxial polymeric film components of the optical component are organized so that the linearly polarized light become circularly polarized after passing through the two uniaxial polymeric films and the TN-LC film. Then the circularly polarized light is reflected so that it passes back through the TN-LC film and the two uniaxial polymeric films one more time and finally becomes linearly polarized and orthogonal to the polarizer. The final step is to use the polarizer to block the outgoing linearly polarized light, causing a dark state, whereby the lamination of the two films and the TN-LC film functions as a quarter-wave film.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A quarter-wave plate device comprising:
   (a) a first and a second uniaxial polymeric films; and
   (b) a twisted nematic-liquid crystal (TN-LC) polymeric film sandwiched between the first and second uniaxial polymeric films to form the quarter-wave plate device with a broadband spectrum.

2. The quarter-wave plate device of claim 1, further comprising:
   (c) a linear polarizer laminated on an exterior surface of one of said first and second uniaxial polymeric films, wherein said linear polarizer receives incident unpolarized light of a wide spectral bandwidth and converts said incident unpolarized light into a linearly polarized light, wherein the linearly polarized light passes through said quarter-wave film and produces a circularly polarized light in a wide spectral bandwidth.

3. The quarter-wave plate device of claim 2, wherein the TN-LC film includes:
   a twist angle of TN-LC film of approximately 77.5 degrees, wherein the incident wave is linearly polarized at approximately $\beta=18.8°$.

4. The quarter-wave plate device of claim 3, wherein the first and second uniaxial polymeric film includes:
   an angle $\alpha 1$ approximately 91.2° and for one of the first and second uniaxial polymeric film; and
   an angle $\alpha 2$ of approximately minus 50.1 for the other one of the first and second uniaxial polymeric film.

5. The quarter-wave plate device of claim 2, wherein the TN-LC film includes:
   one of a left handedness and a right handedness twist sense.

6. The quarter-wave plate device of claim 2, wherein the TN-LC film includes:
   a TN-LC film having a thickness of approximately 4.9 $\mu$m and a corresponding retardation of approximately 0.891$\lambda$, wherein $\lambda=550$ nm.

7. The quarter-wave plate device of claim 2, wherein the first and second uniaxial polymeric films includes:
   a first uniaxial polymeric film thickness of approximately 3.3 $\mu$m and a corresponding retardation of approximately 0.198$\lambda$; and
   a second uniaxial polymeric film thickness of approximately 2.48 $\mu$m and a corresponding retardation of approximately 0.149$\lambda$.

8. A broadband circular polarizer comprising:
   a first and second uniaxial polymeric film;
   a twisted nematic-liquid crystal (TN-LC) polymeric film sandwiched between said first and second uniaxial polymeric film; and
   a linear polarizer laminated on an exterior surface of one of the first and the second uniaxial polymeric films to form said broadband circular polarizer.

9. The broadband circular polarizer of claim 8, wherein the TN-LC film includes:
   a twist angle of TN-LC film of approximately 77.5 degrees, wherein the incident wave is linearly polarized at approximately $\beta=18.8°$.

10. The broadband circular polarizer of claim 8, wherein the first and second uniaxial polymeric film includes:
    an angle $\alpha 1$ approximately 91.2° and for one of the first and second uniaxial polymeric film; and
    an angle $\alpha 2$ of approximately minus 50.1 for the other one of the first and second uniaxial polymeric film.

11. The broadband circular polarizer of claim 8, wherein the TN-LC film includes:
    one of a left handedness and a right handedness twist sense.

12. The broadband circular polarizer of claim 8, wherein the first and second uniaxial polymeric films includes:
    a first uniaxial polymeric film thickness of approximately 3.3 $\mu$m and a corresponding retardation of approximately 0.198$\lambda$; and
    a second uniaxial polymeric film thickness of approximately 2.48 $\mu$m and a corresponding retardation of approximately 0.149$\lambda$.

* * * * *